Dec. 19, 1967    N. J. HUGHES    3,358,727
COUNTERBORING FLANGED NUT

Filed Feb. 26, 1965    3 Sheets-Sheet 1

Inventor:
Norman J. Hughes,
by Philip E. Parker
Atty.

Dec. 19, 1967        N. J. HUGHES        3,358,727
COUNTERBORING FLANGED NUT
Filed Feb. 26, 1965        3 Sheets-Sheet 2
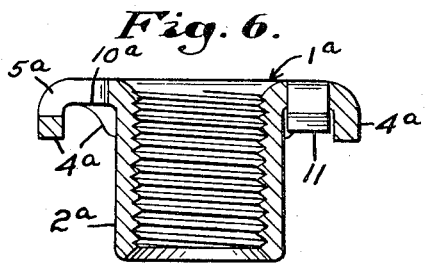
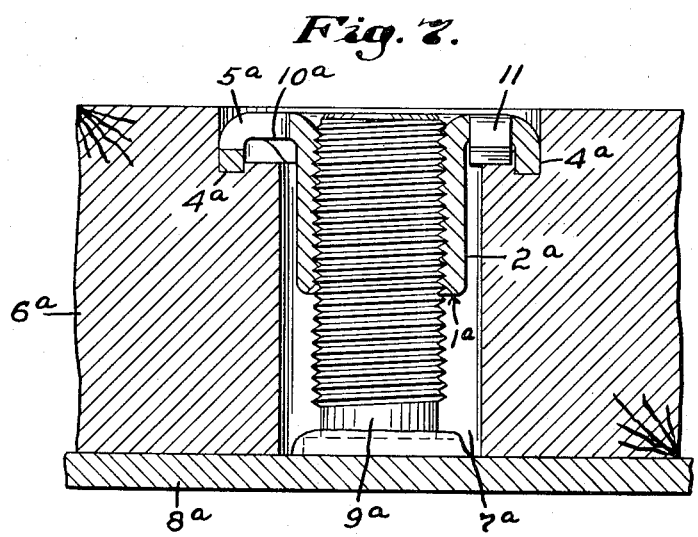
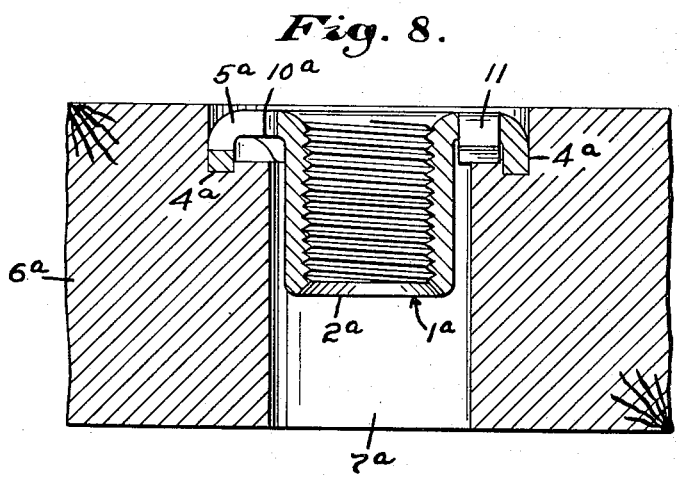
Inventor:
Norman J. Hughes,
by Philip E. Parker
Atty.

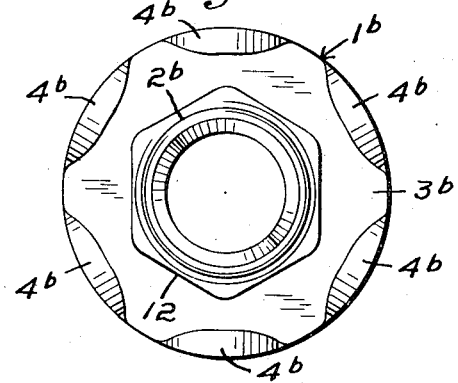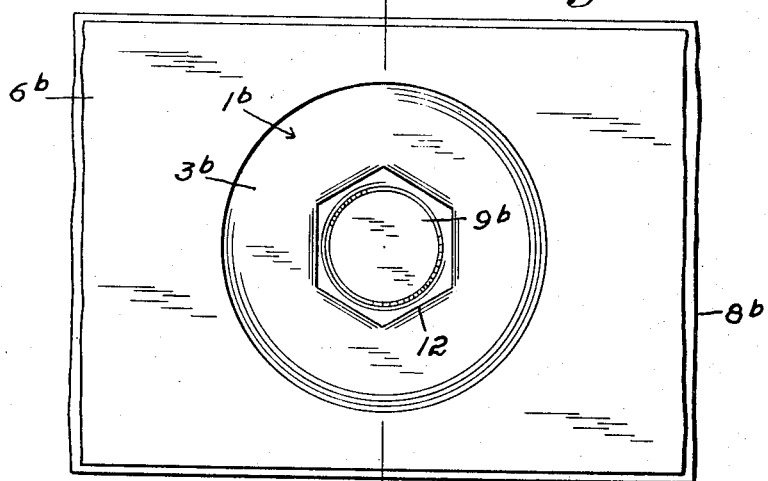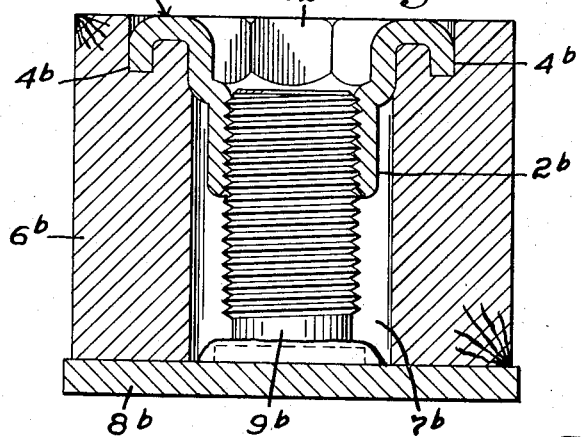

United States Patent Office 3,358,727
Patented Dec. 19, 1967

3,358,727
COUNTERBORING FLANGED NUT
Norman J. Hughes, Melrose, Mass., assignor to United-Carr Incorporated, Boston, Mass., a corporation of Delaware
Filed Feb. 26, 1965, Ser. No. 435,435
3 Claims. (Cl. 151—41.73)

This invention relates generally to threaded fastener members and more particularly to threaded fastener members adapted to be counterbored within a supporting workpiece.

While the invention is seen to have a considerable number of diverse applications, for purposes of illustration it is clearly understood by considering it in the light of the industrial need which has constituted the principal motivation for its development; namely, the installation of wooden flooring in railroad freight cars. Procedurally the installation of such flooring has in the past been accomplished by laying wooden planking having a plurality of predrilled apertures therein over the metal base of a freight car, placing threaded bolts in each of the apertures, welding the heads of the bolts to the metal base and thereafter securing the planking by applying threaded nuts to the welded bolts.

The reader will of course appreciate that it is highly undesirable to have nuts, bolts or any other fastening means protruding above the exposed or load-bearing surfaces of the flooring. Thus the procedure in the past has been to employ a flanged nut (more commonly called a T-nut) and counterbore the planking to provide a cavity adjacent the upper surface thereof to receive the flange of the T-nut. This procedure eliminated any other obstructions at the exposed surface of the flooring and if desired the cavity above the flange of the nut could be filled with "plastic wood" or some other filler to conceal the fasteners.

The principal object of the present invention is to accomplish the same result with the elimination of the separate time-consuming and expense-creating counterboring operation on the planking.

A further object of the invention is to provide a heavy duty, threaded fastener member which can be conveniently installed entirely internally of an apertured workpiece.

Figure 1:
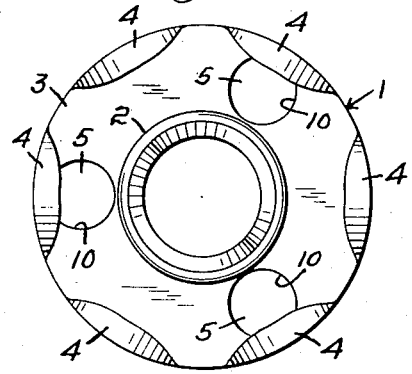
Figure 2:
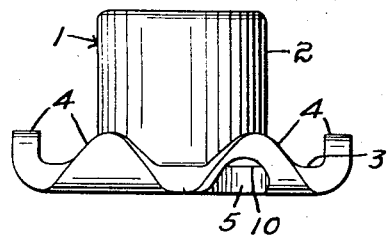
Figure 3:
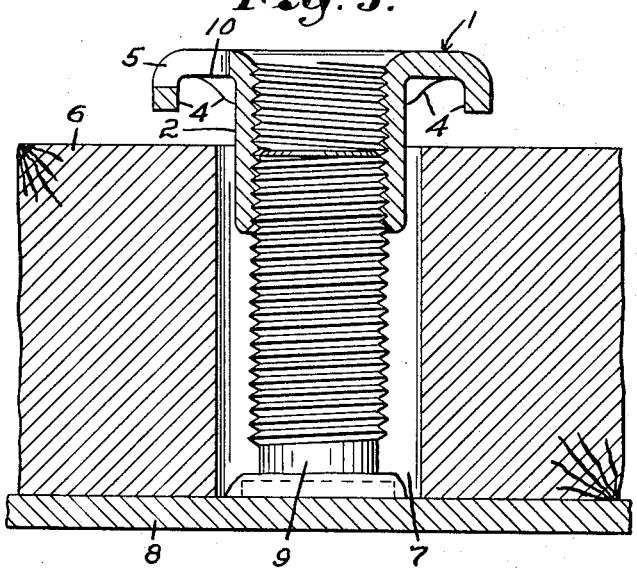
Figure 4:
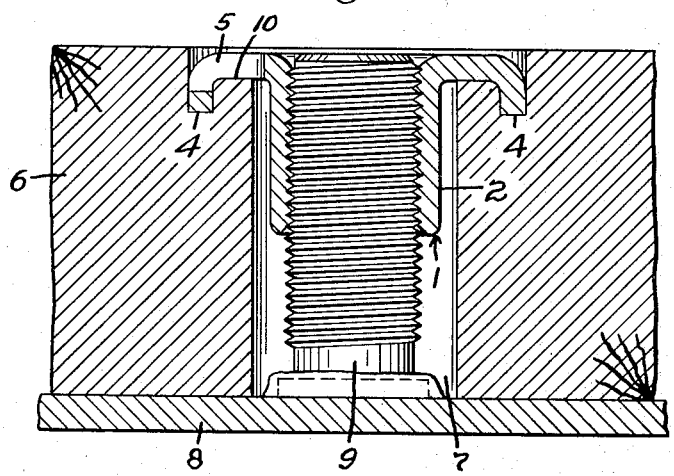
Figure 5:
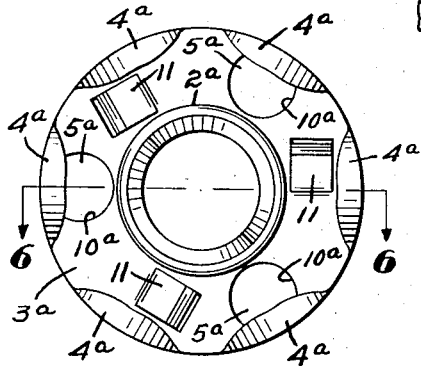

Other objects and advantages of the novel fastener will become evident from a reading of the following detailed description in conjunction with a viewing of the accompanying drawings in which FIG. 1 is a bottom plan view of the fastener;
FIG. 2 is a side elevation of the fastener;
FIG. 3 is a sectional view of an installation prior to the counterboring of the fibrous member by the fastener;
FIG. 4 is a sectional view of an installation wherein the novel fastener has bored a cavity in the fibrous member and is seated entirely internally thereof;
FIG. 5 is a bottom plan view of an alternate form of the invention wherein additional cutting means are provided;
FIG. 6 is a section taken on line 6—6 of FIG. 5;
FIG. 7 is a sectional view of an installation similar to that of FIG. 4 depicting the alternate form of FIG. 6 fully seated in the fibrous member;
FIG. 8 is a sectional view depicting the seating of the fastener of FIG. 6 in a fibrous member wherein the fastener is not simultaneously torqued onto a bolt;
FIG. 9 is a bottom plan view of another alternate and somewhat more simplified form of the invention;
FIG. 10 is a top plan view of an installation depicting the fastener of FIG. 9 securing a fibrous member to a base member; and
FIG. 11 is a section taken on line 11—11 of FIG. 10.

The fastener 1 shown in FIGS. 1 and 2 includes an internally threaded, tubular barrel portion 2 having a peripheral flange 3 extending outwardly from one end thereof. Portions of the outer edge of the flange 3 have been bent towards the opposite end of the barrel to provide a plurality of arcuately profiled fins 4 spaced about the circumference of the flange 3. The fins 4 are designed to act as cutting blades in a manner to be more fully described hereinafter.

In addition, portions of the flange 3 have been blanked out to provide a number of apertures 5 located between certain of the fins 4 and the barrel portion 2.

FIGS. 3 and 4 depict the installation of a section of planking (flooring) utilizing the novel fastener 1. The wooden planking 6 having an aperture 7 therein is seated on a metal base 8; for example, the metal base of a railroad freight car. The threaded stud or bolt 9 is welded at its head to the base 8; the aperture 7 being of sufficient diameter to permit insertion of a welding tool (not shown) used in carrying out the aforementioned attachment of the bolt to the base 8. Alternatively, the stud 9 may be welded to the base 8 prior to the overlying of the planking 6 in which instance the diameter of the aperture 7 may be reduced in that the need for clearance to accommodate a welding tool is obviated.

The planking is thereafter secured by torquing the nut 1 onto the threaded bolt 9. This may be accomplished utilizing a power driven rotary tool (not shown) having a well-known three point spanner fitting which seats in each of the apertures 5. As the nut 1 is driven onto the bolt 9 the fins 4 shear the fibers of the planking 6 which come into direct contact therewith and the remaining fibers between the aperture 7 and the fins 4 are compressed inwardly and thereafter sheared away by the sharp edges 10 of the flange 3 defining the apertures 5. Thus the counterboring operation is performed as the nut is torqued onto the bolt and the nut in its entirety is seated below the exposed or upper surface of the planking 6. As previously mentioned the fasteners may be concealed by a filler if desired.

FIGS. 5–8 depict an alternate form of the invention wherein additional portions of the flange 3a have been partially sheared therefrom and bent towards the tubular barrel 2a to provide a number of ramp-like cutters 11. This alternate form may be installed in the same manner as previously described with reference to FIGS. 1–4 and is seen to have particular application where harder, tough fibered planking is to be installed.

In addition, this alternate form of the invention may be readily seated in a section of planking or flooring without being simultaneously torqued onto a bolt as is depicted in FIG. 8. The reader will appreciate that there are many industrial applications wherein it is desirable to preinstall fasteners in precut or prefabricated components of a structure, which fasteners are to be available for use at some future stage of the over-all construction or for securing equipment to be mounted in or on the structure. Two pertinent examples would be false flooring in a room designed to house electrical equipment wherein cabling for the equipment is concealed beneath the false flooring, and the equipment itself is bolted to the false flooring; and precut or prefabricated decking for a ship wherein equipment such as deck chairs are to be bolted to the decking once the basic construction of the ship has been completed.

Thus, if one assumes that the plank 6a of FIG. 8 represents a section of precut decking for a ship, the fastener 1a may be counterbored in one surface of the decking in the manner previously described whereupon the decking may be laid with the fastener's flanged end adjacent the base or hull of the ship. Since the fastener is countersunk it will not interfere with a level seating of the planking and it is thereafter available for the bolting of deck chairs or other equipment to the opposite exposed surface of the decking. Once again, the time-consuming and expensive procedure of precounterboring the planking is eliminated; and, what is more important, the fins 4a and cutters dig into the fibrous material to resist rotation of the nut when a bolt is later attached thereto.

A third, and somewhat more simplified form of the invention, wherein the apertures and cutters in the flange have been eliminated is depicted in FIGS. 9, 10, and 11. Tests have shown that this latter form performs as well as the previously discussed variations when the workpiece is of a comparatively softer fibrous material. The fins 4b cut into the fibers in the manner previously described but the fibers between the fins and the barrel 2b being softer tend to be fractured to a degree by the cutting action of the fins, and are thereafter compressed downwardly by the portions of the flange between the fins and the barrel. In short, the interior fibers tend to be compressed rather than sheared away as was the case with the earlier-mentioned forms of the invention. The elimination of the apertures and cutters in the flange in addition to rendering the device somewhat cheaper to produce also eliminates the possibility of water or other foreign matter passing into the aperture in the planking which, in certain applications may be undesirable in that water might cause the planking to rot internally. In addition, the nut of FIGS. 9, 10, and 11 is provided with a hex-shaped upper barrel portion 12 which may be conveniently engaged by a hex tool (not shown) for driving the nut onto the bolt and into the planking.

It should be noted that the previously described forms of the invention might also be provided with the hex barrel portion should the user desire to drive from the center rather than by employing a spanner wrench.

While the foregoing description has disclosed a number of variations of the invention, it is nevertheless to be construed as illustrative rather than restrictive or limiting in nature; the scope of the invention being best described by the following claims.

What is claimed is:
1. A fastener adapted to counterbore its way into and below the surface of an apertured workpiece comprising a barrel portion which is inserted into the aperture and a peripheral flange extending outwardly from one end of said barrel portion, portions of the periphery of said flange being bent towards the end of said barrel portion opposite said one end to provide a plurality of arcuately profiled fins defining with said flange an uninterrupted leading edge for cutting a groove in the workpiece concentrically spaced from the aperture therein, said flange having a plurality of through openings formed therein and extending from immediately adjacent said barrel portion across the non-bent portions of said flange and into certain of said fins, whereby upon the simultaneous application of axial and rotational force to said fastener said fins will cut a groove in the workpiece and compress the portions of the workpiece between the groove and the aperture therein inwardly and upwardly into said openings, which portions are sheared away by the edges of said flange defining said openings and escape through said openings.

2. A fastener according to claim 1 including additional workpiece shearing means extending from the non-bent portions of said flange.

3. A fastener according to claim 1 wherein said means is a plurality of ramp-like blades struck from said flange and bent toward the end of said barrel portion remote from said flange.

References Cited

UNITED STATES PATENTS

| 126,366 | 4/1872 | Wills | 85—43 |
| 298,427 | 5/1884 | Stone | 85—43 |
| 378,614 | 2/1888 | Palmer | 85—43 |
| 1,485,491 | 3/1924 | Drake | 85—43 |
| 2,037,586 | 4/1936 | Olson | 151—37 |
| 2,102,558 | 12/1937 | Johnson | 151—41.73 |
| 2,764,053 | 9/1956 | Lovisek | 85—43 |
| 2,784,636 | 3/1957 | Bohmer | 85—43 |
| 3,305,987 | 2/1967 | Weaver | 287—20.94 |

FOREIGN PATENTS

| 1,277,555 | 10/1961 | France. |
| 303,545 | 12/1932 | Italy. |

MARION PARSONS, JR., *Primary Examiner.*

EDWARD C. ALLEN, *Examiner.*

G. A. MILWICK, *Assistant Examiner.*